(12) United States Patent
Wells et al.

(10) Patent No.: US 6,687,721 B1
(45) Date of Patent: Feb. 3, 2004

(54) RANDOM NUMBER GENERATOR WITH ENTROPY ACCUMULATION

(75) Inventors: Steven E. Wells, El Dorado Hills, CA (US); David A. Ward, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/541,375

(22) Filed: Mar. 31, 2000

(51) Int. Cl.[7] ................................................. G06F 1/02
(52) U.S. Cl. ...................................................... 708/250
(58) Field of Search ................................ 708/250–256, 708/3; 380/46

(56) References Cited

U.S. PATENT DOCUMENTS

| | | |
|---|---|---|
| 3,790,768 A | 2/1974 | Chevalier et al. |
| 4,578,649 A | 3/1986 | Shupe |
| 4,694,412 A | 9/1987 | Domenik et al. |
| 4,791,594 A | 12/1988 | Harney et al. |
| 4,810,975 A | 3/1989 | Dias |
| 4,855,690 A | 8/1989 | Dias |
| 5,007,087 A | 4/1991 | Bernstein et al. |
| 5,473,692 A | 12/1995 | Davis |
| 5,539,828 A | 7/1996 | Davis |
| 5,568,552 A | 10/1996 | Davis |
| 5,627,775 A | 5/1997 | Hong et al. |
| 5,706,218 A | 1/1998 | Hoffman |
| 5,778,069 A * | 7/1998 | Thomlinson et al. ....... 708/250 |
| 5,778,070 A | 7/1998 | Mattison |
| 5,781,458 A | 7/1998 | Gilley |
| 5,805,712 A | 9/1998 | Davis |
| 5,828,753 A | 10/1998 | Davis |
| 5,835,594 A | 11/1998 | Albrecht et al. |
| 5,844,925 A | 12/1998 | Dent |
| 5,844,986 A | 12/1998 | Davis |
| 6,026,016 A | 2/2000 | Gafken |
| 6,061,702 A | 5/2000 | Hoffman |
| 6,104,811 A | 8/2000 | Aiello et al. |
| 6,195,433 B1 | 2/2001 | Vanstone et al. |
| 6,209,098 B1 | 3/2001 | Davis |
| 6,253,223 B1 * | 6/2001 | Sprunk ........................ 708/250 |

FOREIGN PATENT DOCUMENTS

| | | |
|---|---|---|
| DE | 4006251 C1 | 4/1991 |
| WO | WO 00/59153 A2 | 10/2000 |
| WO | WO 00/59153 | 1/2001 |

OTHER PUBLICATIONS

U.S. patent application No. 09/540,915, filed Mar. 31, 2000, entitled Secure Hardware Random Number Generator, by Steven E. Wells, V. Niles Kynett and Lance W. Dover.

U.S. patent application No. 09/752,088, filed Dec. 29, 2000, entitled Integrated Circuit Chip Having Firmware and Hardware Security Primitive Device(s), by Steven E. Wells and V. Niles Kynett.

Schneier, Bruce, Applied Cryptography, John Wiley & Sons, Inc., pp. vii–xiv and 369–395 (2nd Ed., 1996).

Blum, M., et al., "Independent Unbiased Coin Flips from a Correlated Biased Source—A Finite State Markov Chain," Combinatorica, vol. 6, No. 2, pp. 97–108 (1986).

Chor, Benny, et al., "Unbiased Bits from Sources of Weak Randomness and Probabilistic Communication Complexity," SIAM Journal on Computing, vol. 17, No. 2, pp. 230–261 (Apr. 1988).

(List continued on next page.)

*Primary Examiner*—Tan V. Mai
(74) *Attorney, Agent, or Firm*—Blakely, Sokoloff, Taylor & Zafman LLP

(57) ABSTRACT

A random number generator includes a random bit source to generate random bits and circuitry to process the generated random bits to accumulate entropy in the generated random bits. The random number generator also includes circuitry to output processed random bits selectively such that at least one processed random bit is not output.

45 Claims, 7 Drawing Sheets

OTHER PUBLICATIONS

Cooper, J. Arlin, Computer Security, pp. 2072–2086 (published prior to Mar. 31, 1999).

Fairfield, R.C., et al., "An LSI Random Number Generator (RNG)," published in Proceedings in Advances in Cryptology Conference on CRYPTO, pp. 203–215 (1984).

Gude, Michael, "Concept for a High Performance Random Number Generator Based on Physical Random Phenomena," Frequenz, 39, pp. 187–190 (Jul./Aug. 1985).

Murry, Herschell F., "A General Approach for Generating Natural Random Variables," IEEE Transactions on Computers, pp. 1210–1213 (Dec. 1970).

Santha, Miklos, et al., "Generating Quasi–Random Sequences from Slightly–Random Sources," Proceedings of the 25th Annual Symposium on Foundations of Computer Science, pp. 434–440 (Oct. 24–26, 1984).

Santha, Miklos et al., "Generating Quasi–random Sequences from Semi–random Sources," Journal of Computer and System Sciences, vol. 33, No. 1, pp. 75–87 (Aug. 1986).

von Neumann, John, "Various Techniques Used in Connection With Random Digits," Applied Mathematics Series, vol. 12, United States Department of Commerce, National Bureau of Standards, pp. 36–38 (Jun. 11, 1951).

Shift Registers, pp. 1725–1727 (published prior to Mar. 31, 1999).

U.S. patent application No. 09/283,096, filed Mar. 31, 1999, entitled Duty Cycle Corrector for a Random Number Generator, by Steven E. Wells and David A Ward.

U.S. patent application No. 09/283,769, filed Mar. 31, 1999, entitled Programmable Random Bit Source, by Steven E. Wells.

* cited by examiner

RANDOM NUMBER GENERATOR WITH ENTROPY ACCUMULATION

BACKGROUND OF THE INVENTION

1. Field of the Invention

The present invention relates generally to the field of computer systems. More particularly, the present invention relates to the field of random number generators for use by computer systems.

2. Description of Related Art

Random number generators may be used for a variety of electronic applications, such as lotteries, gambling machines, video games, image processing and reconstruction, music and graphics composition, scientific and financial modeling simulation, program and algorithm testing, equation-solving, and computer security for example. For computer security applications such as cryptography, digital signatures, and protected communication protocols, for example, random numbers are a fundamental building block for strengthening and securing the confidentiality of electronic communications.

Random numbers are a sequence of independent numbers with a specified distribution and a specified probability of falling in any given range of values. An ideal random number generator provides a stream of uniformly distributed, non-deterministic, independent bits over an infinite data.

Random number generators generate and output random bits each with some amount of entropy or randomness depending on how the random bits are generated. A single bit can have anywhere between zero entropy, that is the single bit has a fully predictable value, and full entropy, that is the single bit has a fully unpredictable value, depending on the quality of the random number generation scheme used to generate the single bit. For typical random number generators, transient perturbations, such as injected noise or periodic phase correlation between oscillators in the random number generator for example, can reduce the entropy of generated random bits.

To compensate for such reduced entropy, typical random number generators inject the generated random bits into an entropy accumulator. One typical entropy accumulator is known as a linear feedback shift register (LFSR) and comprises a series of latches with an output random bit flowing back to the input of the LFSR. Each random bit input to the LFSR is typically exclusive-ORed with the random bit being output from the last latch in the LFSR, with the exclusive-OR result being input to the first latch in the LFSR. One or more random bits output from the first or an intermediate latch may also be exclusive-ORed with the random bit being output from the last latch in the LFSR, with the exclusive-OR result being input to the next latch in the LFSR. As a result, the random bits output from the LFSR have an entropy approximating the average entropy injected into the LFSR. The LFSR therefore effectively filters out instantaneous reductions of entropy.

The random bit output from the last latch in the LFSR, however, is also output by the random number generator and therefore becomes known. That random bit therefore has zero entropy with respect to the random bits not yet output and therefore does not contribute to the entropy added to the first latch through the first exclusive-OR operation. Because the amount of entropy output by the LFSR can exceed the amount of entropy injected into the LFSR and because the LFSR state can be derived by reading n bits of output, where n is the number of latches in the LFSR, propagating random bits through an LFSR in this manner offers relatively minimal entropy accumulation.

BRIEF DESCRIPTION OF THE DRAWINGS

The present invention is illustrated by way of example and not limitation in the figures of the accompanying drawings, in which like references indicate similar elements and in which.

DETAILED DESCRIPTION

The following detailed description sets forth an embodiment or embodiments in accordance with the present invention for a random number generator with entropy accumulation. In the following description, details are set forth such as specific random bit sources, techniques, etc., in order to provide a thorough understanding of the present invention. It will be evident, however, that the present invention may be practiced without these details. In other instances, well-known computer and electronic components, etc., have not been described in particular detail so as not to obscure the present invention.

EXEMPLARY COMPUTER SYSTEM

Figure 1:
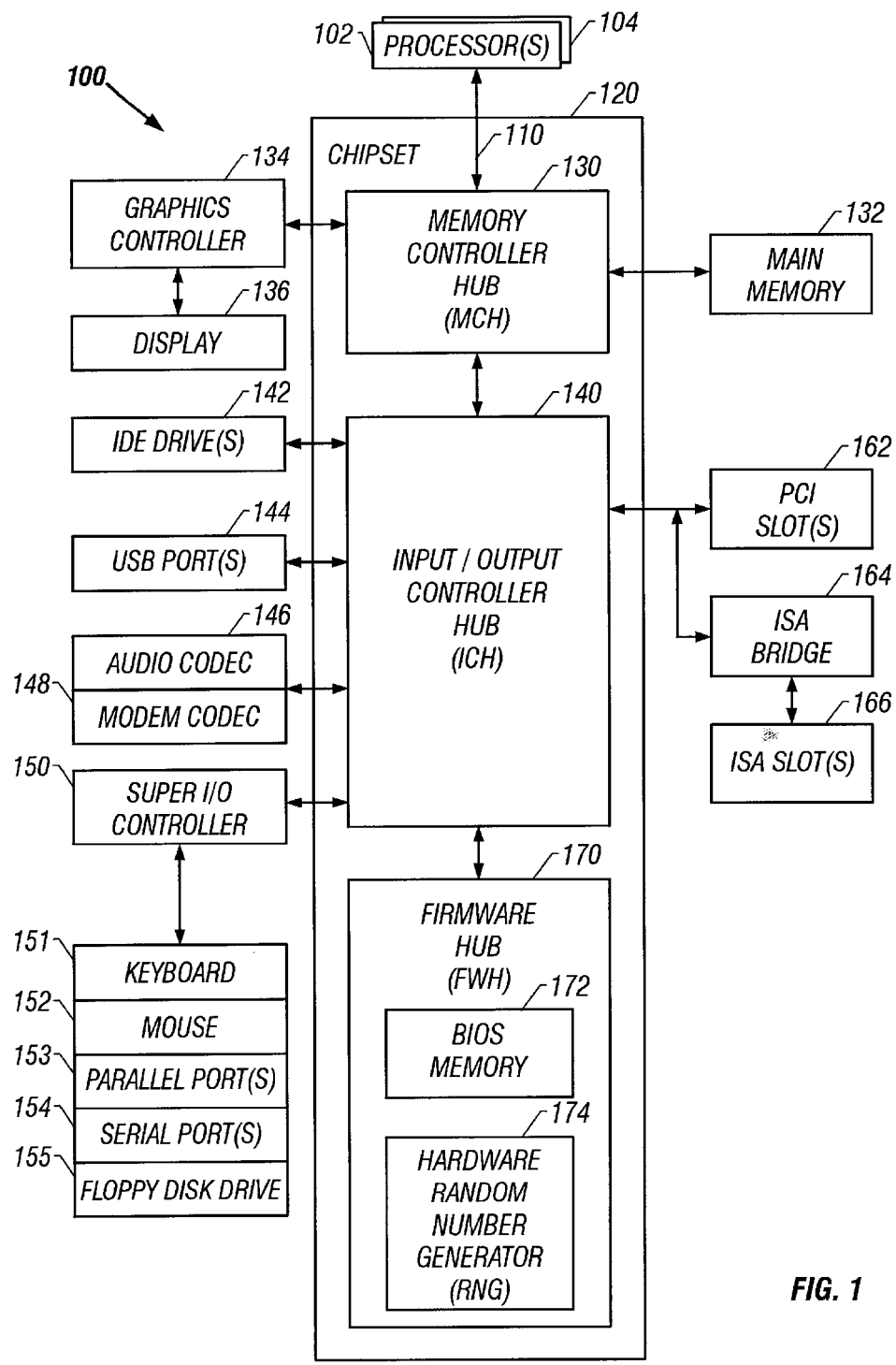
FIG. 1 illustrates an exemplary computer system having a random number generator.

FIG. 1 illustrates an exemplary computer system 100 having a hardware random number generator (RNG) 174 in accordance with the present invention. Although described in the context of computer system 100, the present invention may be implemented in any suitable computer system comprising any suitable one or more integrated circuits.

As illustrated in FIG. 1, computer system 100 comprises processors 102 and 104, a processor bus 110, and a chipset 120. Processors 102 and 104 and chipset 120 are coupled to processor bus 110. Processors 102 and 104 may each comprise any suitable processor, such as, for example, a processor in the Pentium® or Celeron™ family of processors available from Intel® Corporation of Santa Clara, Calif. Computer system 100 for other embodiments may comprise one, three, or more processors.

Chipset 120 for one embodiment comprises a memory controller hub (MCH) 130, an input/output (I/O) controller hub (ICH) 140, and a firmware hub (FWH) 170. MCH 130, ICH 140, and FWH 170 may each comprise any suitable circuitry and for one embodiment are each formed as a separate integrated circuit chip. Chipset 120 for other embodiments may comprise any suitable one or more integrated circuit devices.

MCH 130 may comprise any suitable interface controllers to provide for any suitable communication link to processor bus 110 and/or to any suitable device or component in communication with MCH 130. MCH 130 for one embodiment provides suitable arbitration, buffering, and coherency management for each interface.

MCH 130 is coupled to processor bus 110 and provides an interface to processors 102 and 104 over processor bus 110. For one embodiment where system 100 comprises only one processor 102, processor 102 may alternatively be combined with MCH 130 to form a single chip. MCH 130 for one embodiment also provides an interface to a main memory 132 and a graphics controller 134 each coupled to MCH 130. Main memory 132 stores data and/or instructions, for example, for computer system 100 and may comprise any suitable memory, such as a dynamic random access memory (DRAM) for example. Graphics controller 134 controls the display of information on a suitable display 136, such as a cathode ray tube (CRT) or liquid crystal display (LCD) for example, coupled to graphics controller 134. MCH 130 for one embodiment interfaces with graphics controller 134 through an accelerated graphics port (AGP). Graphics controller 134 for one embodiment may alternatively be combined with MCH 130 to form a single chip.

MCH 130 is also coupled to ICH 140 to provide access to ICH 140 through a hub interface. ICH 140 provides an interface to I/O devices or peripheral components for computer system 100. ICH 140 may comprise any suitable interface controllers to provide for any suitable communication link to MCH 130 and/or to any suitable device or component in communication with ICH 140. ICH 140 for one embodiment provides suitable arbitration and buffering for each interface.

For one embodiment, ICH 140 provides an interface to one or more suitable integrated drive electronics (IDE) drives 142, such as a hard disk drive (HDD) or compact disc read only memory (CD ROM) drive for example, to store data and/or instructions for example, one or more suitable universal serial bus (USB) devices through one or more USB ports 144, an audio coder/decoder (codec) 146, and a modem codec 148. ICH 140 for one embodiment also provides an interface through a super I/O controller 150 to a keyboard 151, a mouse 152, one or more suitable devices, such as a printer for example, through one or more parallel ports 153, one or more suitable devices through one or more serial ports 154, and a floppy disk drive 155. ICH 140 for one embodiment further provides an interface to one or more suitable peripheral component interconnect (PCI) devices coupled to ICH 140 through one or more PCI slots 162 on a PCI bus and an interface to one or more suitable industry standard architecture (ISA) devices coupled to ICH 140 by the PCI bus through an ISA bridge 164. ISA bridge 164 interfaces with one or more ISA devices through one or more ISA slots 166 on an ISA bus.

ICH 140 is also coupled to FWH 170 to provide an interface to FWH 170. FWH 170 may comprise any suitable interface controller to provide for any suitable communication link to ICH 140. FWH 170 for one embodiment may share at least a portion of the interface between ICH 140 and super 1/0 controller 150. FWH 170 comprises a basic input/output system (BIOS) memory 172 to store suitable system and/or video BIOS software. BIOS memory 172 may comprise any suitable non-volatile memory, such as a flash memory for example.

FWH 170 also comprises hardware random number generator (RNG) 174 to generate random bits to form random numbers, for example. Processor 102 and/or processor 104 may use random bits generated by RNG 174 for any suitable purpose or application, such as for lotteries, gambling machines, video games, image processing and reconstruction, music and graphics composition, scientific and financial modeling simulation, program and algorithm testing, equation-solving, and computer security applications such as cryptography, digital signatures, and protected communication protocols, for example. Processor 102 and/or processor 104 for one embodiment may combine random bits generated by RNG 174 to form a random number of any suitable size, such as 32-bits, 40-bits, 56-bits, 64-bits or 128-bits for example, for use for cryptography, digital signatures, and protected communication protocols, for example. Processor 102 and/or processor 104 may access one or more random bits generated by RNG 174 through MCH 130 and ICH 140.

Although RNG 174 is described as integrated with FWH 170, RNG 174 for other embodiments may be implemented as a separate component or chip or integrated with any other suitable integrated circuit device.

RANDOM NUMBER GENERATOR

Figure 2:
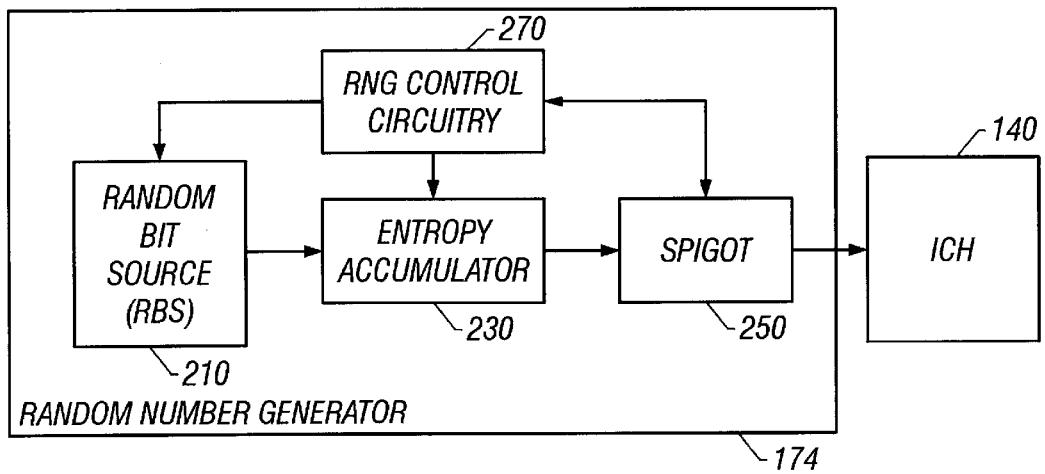
FIG. 2 illustrates, for one embodiment, a random number generator in block diagram form.

RNG 174 generates and outputs one or more random bits for computer system 100. RNG 174 for one embodiment comprises a random bit source (RBS) 210, an entropy accumulator 230, a spigot 250, and RNG control circuitry 270 as illustrated in FIG. 2. RBS 210, entropy accumulator 230, and spigot 250 generate and output random bits under control of RNG control circuitry 270 in accordance with a flow diagram 300 as illustrated in FIG. 3.

Random Bit Source

Figure 3:
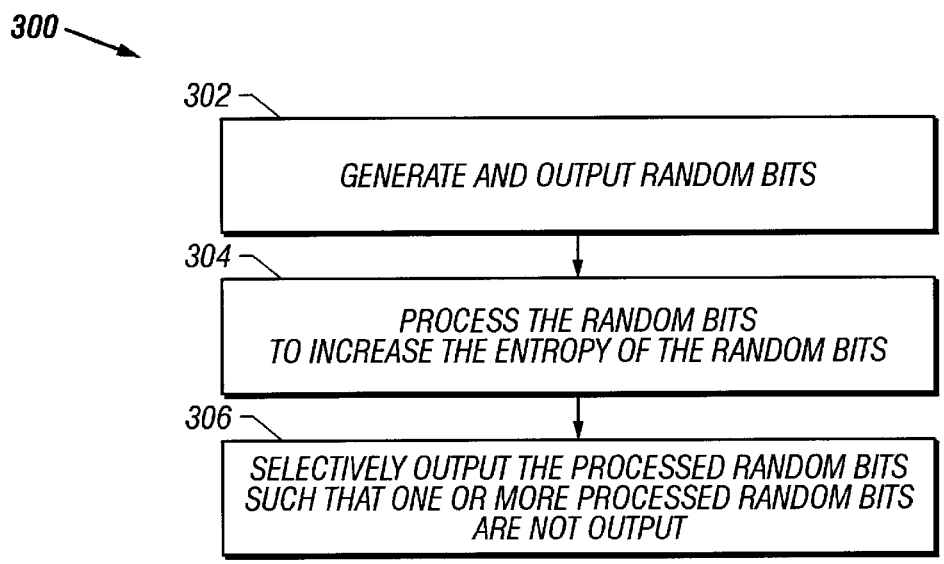
FIG. 3 illustrates, for one embodiment, a flow diagram for generating and outputting random bits with accumulated entropy.

For block 302 of FIG. 3, RBS 210 generates and outputs random bits. RBS 210 may comprise any suitable circuitry, including suitable analog and/or suitable digital circuitry, and/or any suitable one or more devices to generate and output random bits using any suitable random source, such as semiconductor or thermal noise for example. RNG control circuitry 270 is coupled to RBS 210 and controls the generation and output of random bits by RBS 210. RNG control circuitry 270 may comprise any suitable circuitry to control the generation and output of random bits by RBS 210 in any suitable manner.

Figure 4:
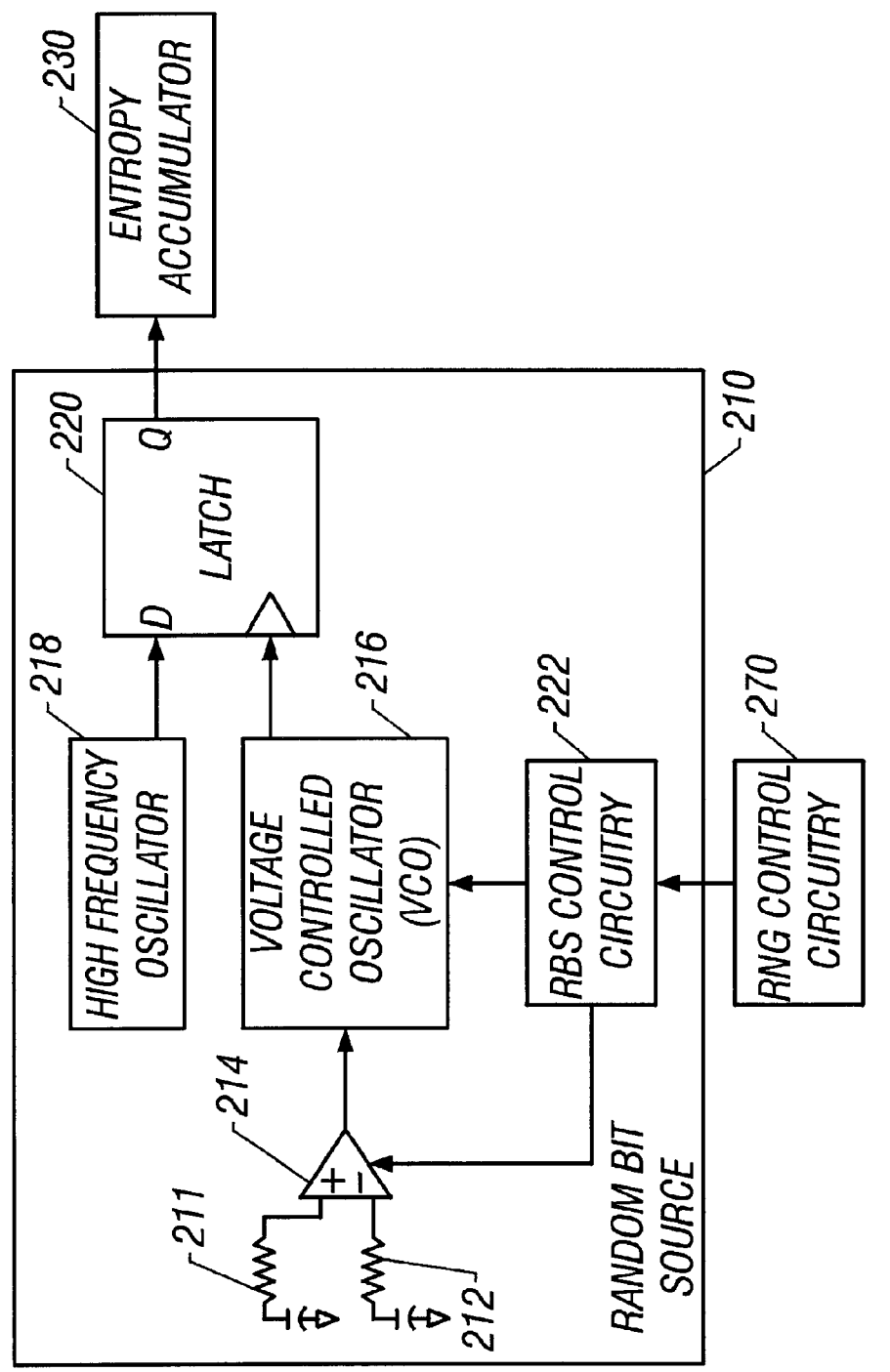
FIG. 4 illustrates, for one embodiment, circuitry for a random bit source.

As illustrated in FIG. 4, RBS 210 for one embodiment comprises resistors 211 and 212, a differential amplifier 214, a relatively low frequency voltage controlled oscillator (VCO) 216, a relatively high frequency oscillator 218, a D-type latch 220, and RBS control circuitry 222.

High frequency oscillator 218 generates and outputs a relatively high frequency digital oscillating signal at an output coupled to a D input terminal of D-type latch 220. High frequency oscillator 218 may operate at any suitable nominal frequency. VCO 216 generates and outputs a relatively low frequency digital oscillating signal at an output coupled to a clock input terminal of D-type latch 220. VCO 216 may operate at any suitable nominal frequency. D-type latch 220 samples the signal generated by high frequency oscillator 218 at a frequency determined by VCO 216 to generate and output a sequence of bit signals or bits at a Q output terminal of D-type latch 220.

The frequency of operation of VCO 216 is controlled by a voltage signal generated and output by differential amplifier 214. The voltage signal is developed from noise from resistors 211 and 212. Resistors 211 and 212 for one embodiment are each fabricated from an n-well in silicon and therefore generate noise due to the inherently random quantum mechanical properties of silicon. Resistors 211 and 212 for one embodiment have approximately the same value of resistance.

Resistor 211 is coupled between a non-inverting input terminal of differential amplifier 214 and a ground terminal. A capacitor is coupled in series between resistor 211 and the ground terminal. Resistor 212 is coupled between an inverting input terminal of differential amplifier 214 and a ground terminal. A capacitor is coupled in series between resistor 212 and the ground terminal. Differential amplifier 214 applies a suitable current through each resistor 211 and 212, incurring a voltage across each resistor 211 and 212. Differential amplifier 214 amplifies the difference in voltage at its input terminals to generate and output the voltage signal at an output coupled to an input terminal of VCO 216. Because this voltage difference varies based on the noise generated within each resistor 211 and 212, VCO 216 generates and outputs a digital oscillating signal at a random frequency. The bits output by D-type latch 220 are therefore random.

RNG control circuitry 270 is coupled to interface with RBS control circuitry 222 to control the generation and output of random bits by RBS 210. RNG control circuitry 270 and RBS control circuitry 222 may comprise any suitable circuitry to control the generation and output of random bits by RBS 210 in any suitable manner. RNG control circuitry 270, for example, may interface with RBS control circuitry 222 to enable and disable RBS 210 selectively to generate and output random bits only as desired or needed to help minimize power consumption by RBS 210.

As illustrated in FIG. 4, RBS control circuitry 222 for one embodiment selectively generates and outputs an enable signal to differential amplifier 214 to enable and disable the generation and output of voltage signals by differential amplifier 214. RBS control circuitry 222 for one embodiment also selectively generates and outputs an enable signal to VCO 216 to enable and disable the generation and output of oscillating signals by VCO 216.

Figure 8:
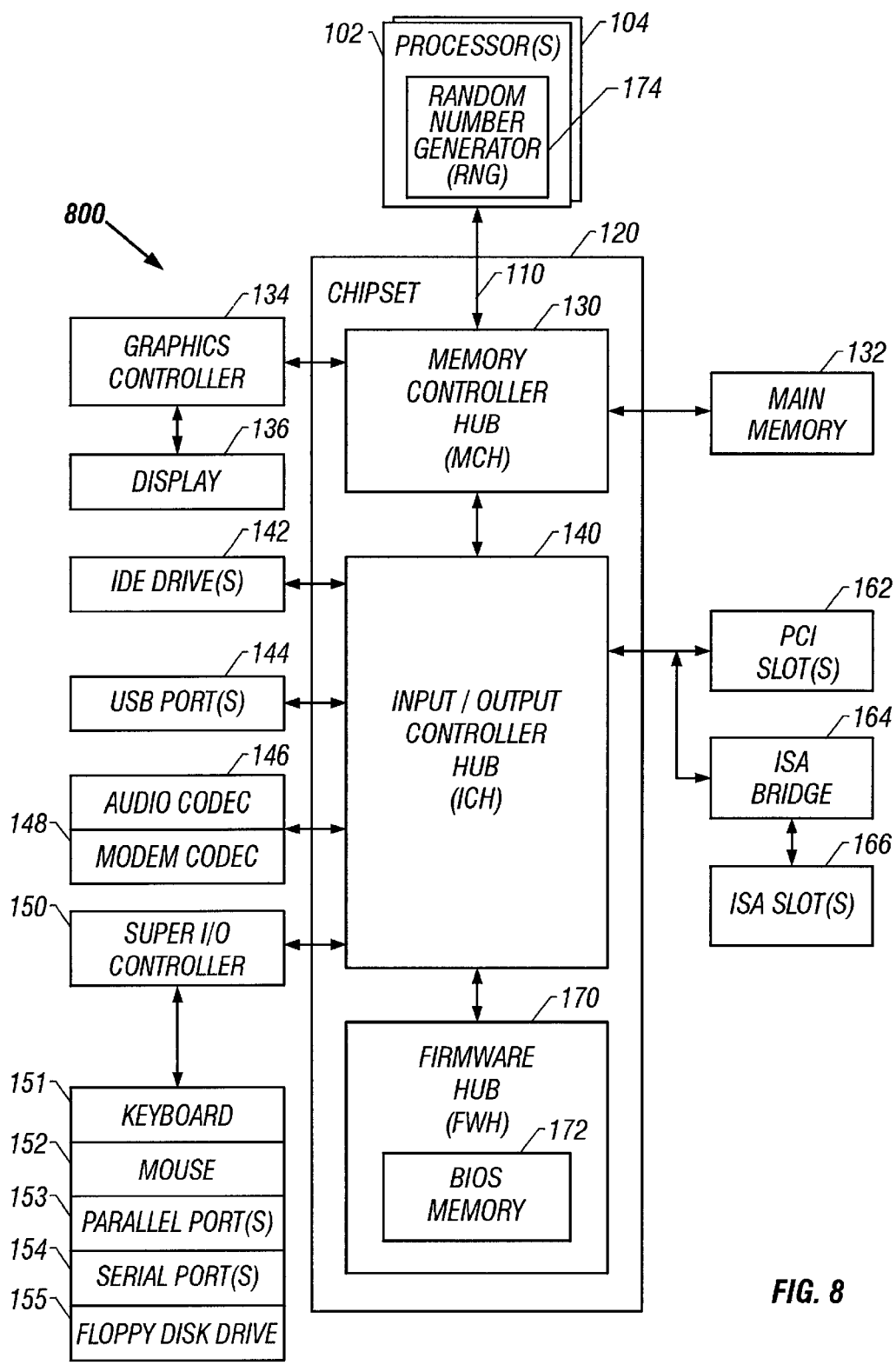
FIG. 8 illustrates, for another embodiment, an exemplary computer system having a random number generator.

For embodiments where RBS 210 uses properties native to silicon circuitry as a source of randomness, such as RBS 210 as illustrated in FIG. 4 for example, RNG 174 may be integrated with any suitable integrated circuit device, such as with FWH 170 as illustrated in FIG. 1 or with processor 102 in a computer system 800 as illustrated in FIG. 8 for example. For computer system 800, another RNG 174 may also be integrated with processor 104. For embodiments where RBS 210 also uses analog circuitry, such as RBS 210 as illustrated in FIG. 4 for example, RNG 174 may be integrated with any suitable integrated circuit device comprising flash memory as analog circuitry fits relatively well within the well-characterized flash process and the unpredictable behavior of RBS 210 works relatively well with a flash-based tester as compared to a vector logic tester. RNG 174 for one embodiment is integrated with FWH 170 where FWH 170 uses flash memory for BIOS memory 172.

Entropy Accumulator

For block 304 of FIG. 3, entropy accumulator 230 processes the random bits generated and output from RBS 210 to accumulate entropy in the random bits and outputs the processed random bits. Entropy accumulator 230 is coupled to RBS 210 to receive random bits output from RBS 210. Entropy accumulator 230 may comprise any suitable circuitry, including analog circuitry and/or digital circuitry, to process and output random bits in any suitable manner. RNG control circuitry 270 is coupled to entropy accumulator 230 and controls the processing of random bits by entropy accumulator 230. RNG control circuitry 270 may comprise any suitable circuitry to control the processing of random bits by entropy accumulator 230 in any suitable manner.

Figure 5:
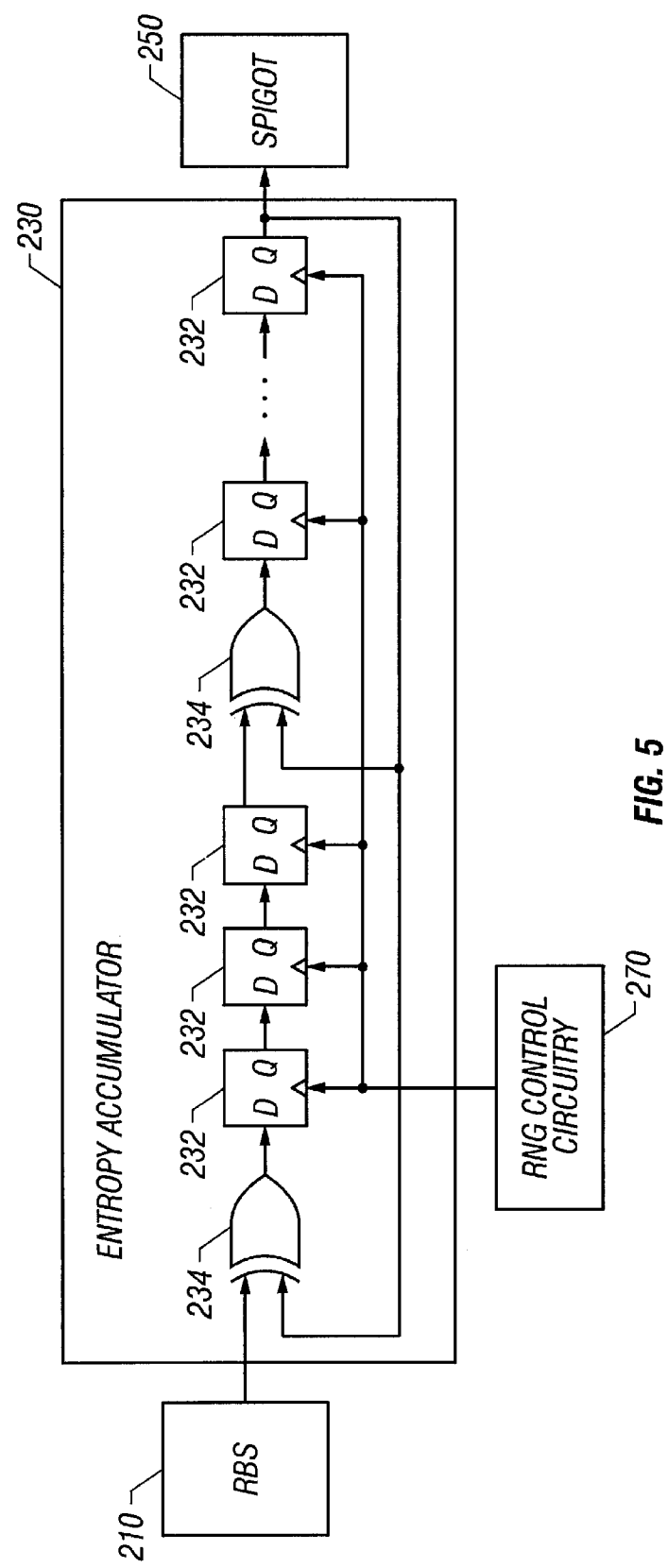
FIG. 5 illustrates, for one embodiment, circuitry for an entropy accumulator.

Entropy accumulator 230 for one embodiment, as illustrated in FIG. 5, comprises a linear feedback shift register (LFSR) having a predetermined number of D-type latches 232 and one or more exclusive-OR gates 234. The LFSR may have any suitable number of D-type latches 232.

The LFSR is coupled to RBS 210 to receive random bits at a first input terminal of an exclusive-OR gate 234, an output of which is coupled to a D input terminal of the first D-type latch 232 in the LFSR. A Q output terminal of each D-type latch 232, with the exception of the last latch 232 in the LFSR, is coupled to a D input terminal of the next succeeding D-type latch 232. The Q output terminal of the last D-type latch 232 is coupled to a second input terminal of the exclusive-OR gate 234 coupled to the D input terminal of the first D-type latch 232. The LFSR may also comprise one or more other exclusive-OR gates 234 each having a first input terminal coupled to the Q output terminal of the last D-type latch 232, a second input terminal coupled to the Q output terminal of the first or an intermediate D-type latch 232, and an output terminal coupled to the D input terminal of the next succeeding D-type latch 232.

The LFSR propagates the random bits output from RBS 210 through each D-type latch 232 under control of a clock signal generated and output by RNG control circuitry 270 at an output coupled to a clock input terminal of each D-type latch 232. The LFSR outputs the random bit latched in the last D-type latch 232. Because each random bit input to the LFSR is exclusive-ORed with the random bit being output from the LFSR and because random bits propagating through one or more intermediate D-type latches are also exclusive-ORed with the random bit being output from the LFSR, the LFSR accumulates entropy in the random bits generated and output by RBS 210.

For other embodiments, entropy accumulator 230 may comprise any other suitable LFSR configured in any suitable manner to accumulate entropy in random bits.

Spigot

For block 306 of FIG. 3, spigot 250 selectively outputs the random bits processed by entropy accumulator 230 such that one or more processed random bits are not output. By not outputting one or more processed random bits from entropy accumulator 230, the value of such one or more processed random bits does not become known, thereby preserving the entropy in such one or more processed random bits. That entropy for one embodiment may be injected into entropy accumulator 230 to accumulate more entropy in processing and outputting random bits. Not outputting one or more processed random bits from entropy accumulator 230 also helps ensure the state of entropy accumulator 230 may not be observed or derived as not all processed random bits output from entropy accumulator 230 may become known.

For one embodiment, spigot 250 selectively outputs the random bits processed by entropy accumulator 230 such that the amount of entropy output by spigot 250 does not exceed the amount of entropy input to entropy accumulator 230. Spigot 250 for one embodiment selectively outputs the random bits processed by entropy accumulator 230 such that the entropy of each processed bit output from spigot 250 approaches full entropy.

Spigot 250 is coupled to entropy accumulator, 230 to receive processed random bits output from entropy accumulator 230. Spigot 250 may comprise any suitable circuitry to output processed random bits selectively in any suitable manner. RNG control circuitry 270 is coupled to spigot 250 and controls the selective outputting of processed random bits by spigot 250. RNG control circuitry 270 may comprise any suitable circuitry to control the selective outputting of processed random bits by spigot 250 in any suitable manner.

Spigot 250 for one embodiment outputs only a first predetermined number of processed, random bits of one or more sets of a second predetermined number of processed random bits output by entropy accumulator 230, where the first predetermined number of bits is less than the second predetermined number of bits. As one example, spigot 250 may selectively output only six of every eight processed random bits output by entropy accumulator 230.

Figure 6:
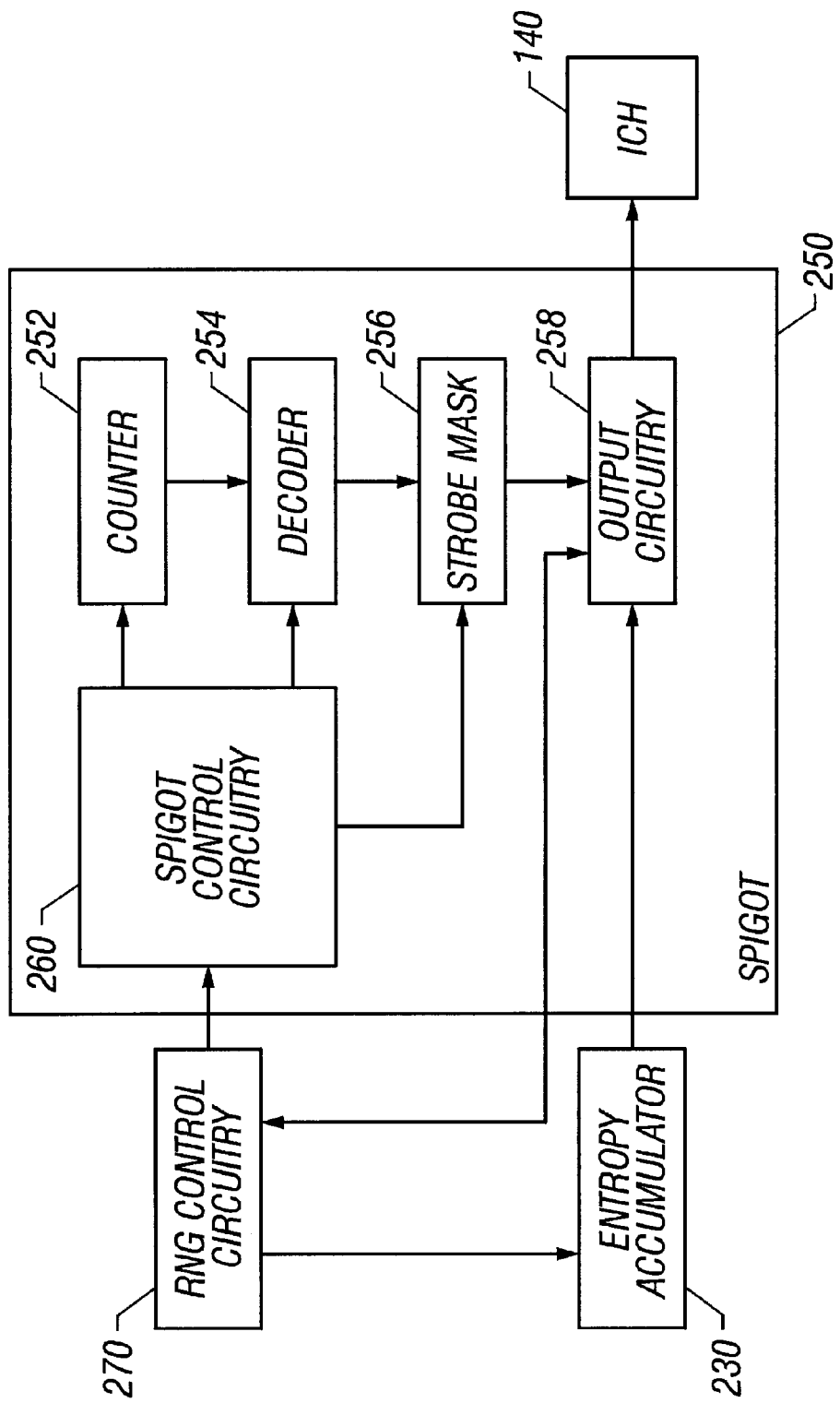
FIG. 6 illustrates, for one embodiment, circuitry for a spigot.

Spigot 250 for one embodiment, as illustrated in FIG. 6, comprises a counter 252, a decoder 254, a strobe mask 256, output circuitry 258, and spigot control circuitry 260.

Counter 252 maintains a count of the number of processed random bits output from entropy accumulator 230. Counter 252 may comprise any suitable circuitry to count in any suitable manner. Counter 252 for one embodiment counts up to a predetermined number of processed random bits output from entropy accumulator 230 and then resets or turns over to count another predetermined number of processed random bits output from entropy accumulator 230. Counter 252 may count up to any suitable number of processed random bits, such as eight for example. The number of processed random bits that may be counted by counter 252 corresponds to a set of processed random bits of which only one or more but less than all of the processed random bits in the set will be output by spigot 250.

Spigot control circuitry 260 is coupled to counter 252, and RNG control circuitry 270 is coupled to interface with spigot control circuitry 260 to control counter 252. RNG control circuitry 270 and spigot control circuitry 260 may comprise any suitable circuitry to control counter 252 in any suitable manner. Spigot control circuitry 260 for one embodiment outputs to counter 252 a clock signal corresponding to the rate at which processed random bits are output from entropy accumulator 230. Spigot control circuitry 260 for one embodiment outputs the clock signal only as processed random bits are output from entropy accumulator 230. RNG control circuitry 270 for one embodiment outputs the clock signal and a clock enable signal to spigot control circuitry 260 to control the output of the clock signal from spigot control circuitry 260.

Decoder 254 is coupled to counter 252 to receive and decode the count maintained by counter 252 and to output the decoded count. Decoder 254 may comprise any suitable circuitry to decode the count maintained by counter 252 and output the decoded count in any suitable manner. Decoder 254 for one embodiment generates and outputs one or more count signals each corresponding to a respective predetermined count. When the count maintained by counter 252 is equal to one of the one or more predetermined counts, decoder 254 generates and outputs the corresponding count signal.

Spigot control circuitry 260 is coupled to decoder 254, and RNG control circuitry 270 is coupled to interface with spigot control circuitry 260 to control decoder 254. RNG control circuitry 270 and spigot control circuitry 260 may comprise any suitable circuitry to control decoder 254 in any suitable manner. Spigot control circuitry 260 for embodiment outputs an enable signal to decoder 254 under control of RNG control circuitry 270.

Strobe mask 256 is coupled to spigot control circuitry 260 to receive strobe signals each corresponding to a processed random bit output from entropy accumulator 230. Strobe mask 256 is also coupled to decoder 254 to receive the decoded count from decoder 254 and to output received strobe signals selectively in accordance with one or more received decoded counts. Strobe mask 256 may comprise any suitable circuitry to output strobe signals selectively in any suitable manner.

Strobe mask 256 for one embodiment masks a received strobe signal when decoder 254 outputs a count signal. Because counter 252 for one embodiment counts up to a predetermined number of processed random bits and because decoder 254 outputs one or more count signals each corresponding to a respective predetermined count, strobe mask 256 for one embodiment masks the strobe signal corresponding to one or more processed random bits of a set of processed random bits. As one example where counter.252 counts up to eight processed random bits and decoder 254 generates and outputs a count signal corresponding to counts of zero and one, strobe mask 256 masks the strobe signal corresponding to the first and second processed random bits of every set of eight processed random bits output from entropy accumulator 230 and outputs the strobe signal corresponding to the third through eighth processed random bits of every set of eight processed random bits output from entropy accumulator 230.

RNG control circuitry 270 is coupled to interface with spigot control circuitry 260 to control strobe mask 256. RNG control circuitry 270 and spigot control circuitry 260 may comprise any suitable circuitry to control strobe mask 256 in any suitable manner. Spigot control circuitry 260 for one embodiment outputs the strobe signals only as processed random bits are output from entropy accumulator 230. RNG control circuitry 270 for one embodiment outputs the strobe signals and a strobe enable signal to spigot control circuitry 260 to control the output of strobe signals from spigot control circuitry 260. For one embodiment, spigot control circuitry 260 outputs as the strobe signals to strobe mask 256 the clock signal received from RNG control circuitry 270 to control counter 252.

Output circuitry 258 is coupled to entropy accumulator 230 to receive processed random bits and is coupled to strobe mask 256 to receive selectively output strobe signals and selectively output the received processed random bits in accordance with the received strobe signals. Output circuitry 258 may comprise any suitable circuitry to output received processed random bits selectively in any suitable manner.

Output circuitry 258 for one embodiment comprises suitable memory circuitry, such as one or more shift registers for example, to receive and store processed random bits selectively in accordance with received strobe signals. As entropy accumulator 230 outputs each processed random bit, the strobe signal corresponding to the processed random bit may or may not be output from strobe mask 256. If strobe mask 256 outputs the strobe signal, output circuitry 258 receives and stores the corresponding processed random bit under control of the strobe signal. If strobe mask 256 does not output the strobe signal, output circuitry 258 ignores the corresponding processed random bit output from entropy accumulator 230. Output circuitry 258 may then output the stored processed random bits in any suitable manner.

RNG control circuitry 270 is coupled to output circuitry 258 to control output circuitry 258. RNG control circuitry 270 may comprise any suitable circuitry to control output circuitry 258 in any suitable manner. RNG control circuitry 270 for one embodiment controls the output of stored processed random bits from output circuitry 258 in response to a read transaction from processor 102, for example. RNG control circuitry 270 for one embodiment may also control the generation and output of random bits from RBS 210 and entropy accumulator 230 based on the number of processed random bits stored by output circuitry 258. RNG control circuitry 270 may, for example, disable RBS 210 and halt entropy accumulator 230 when output circuitry 258 is filled with unread processed random bits.

Scalability

RNG control circuitry 270 and spigot 250 for one embodiment may adaptively adjust the rate at which processed random bits are output from spigot 250. RNG control circuitry 270 may, for example, monitor the amount of entropy injected into entropy accumulator 230 based on the rate at which random bits output from RBS 210 are injected into entropy accumulator 230 and based on an estimate of the entropy of each bit output from RBS 210. RNG control circuitry 270 may also monitor the rate at which processed random bits are output from spigot 250. RNG control circuitry 270 may then estimate the amount of entropy accumulated by entropy accumulator 230 and adjust the rate at which processed random bits are output from spigot 250 as desired. RNG control circuitry 270 for one embodiment may also monitor the output entropy rate of RBS 210 and adaptively adjust spigot 250 as desired.

RNG control circuitry 270 and spigot 250 may comprise any suitable circuitry to adjust the rate at which processed random bits are output from spigot 250 adaptively. For spigot 250, for one embodiment, counter 252 may comprise any suitable circuitry to adjust the predetermined number of processed random bits that may be counted. Decoder 254 may comprise any suitable circuitry to adjust the one or more predetermined counts at which decoder 254 outputs a corresponding count signal. Strobe mask 256 may comprise any suitable circuitry to adjust which count signals output from decoder 254 are used to mask strobe signals. Counter 252, decoder 254, and/or strobe mask 256 may be adjusted under control of RNG control circuitry 270 and spigot control circuitry 260 in any suitable manner.

Figure 7:
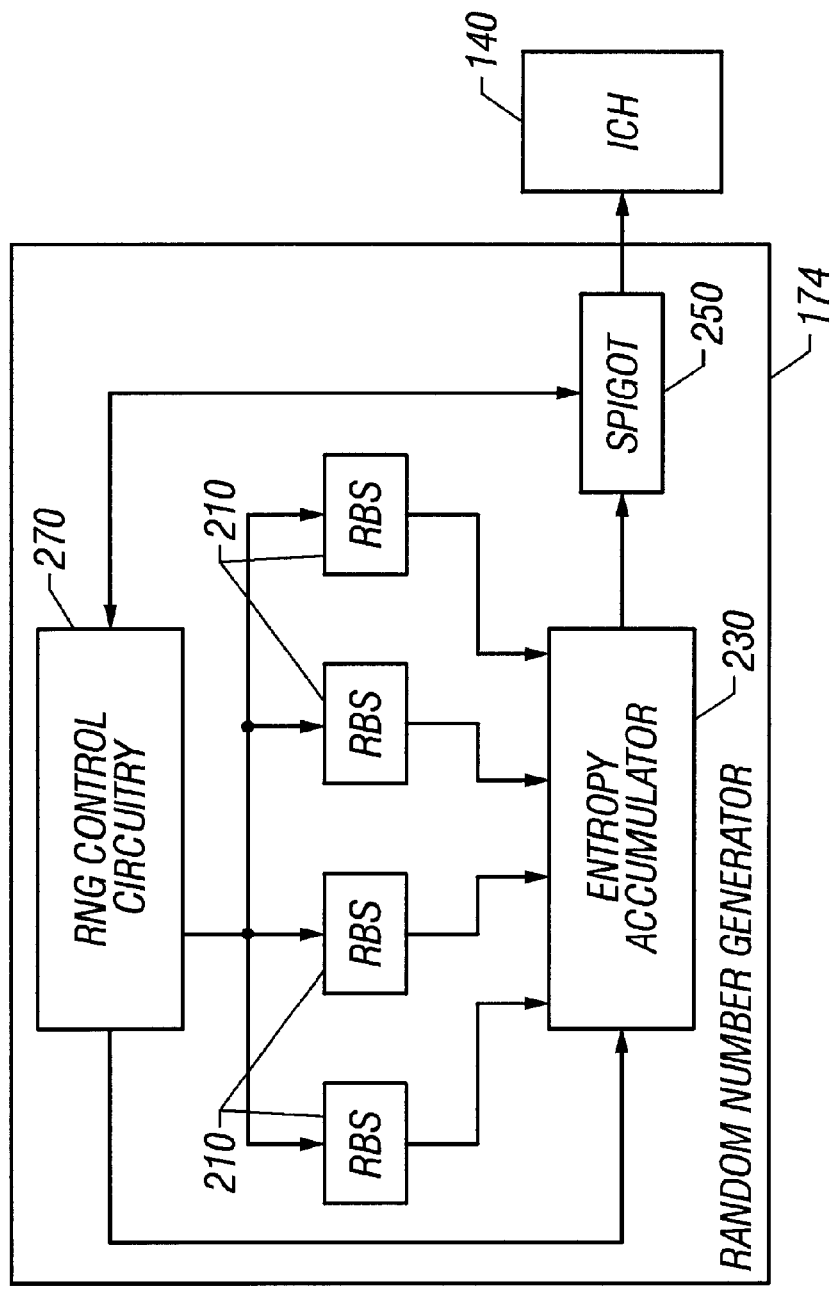
FIG. 7 illustrates, for another embodiment, a random number generator in block diagram form.

RNG 174 for another embodiment injects new random bits generated and output from multiple RBSs 210 into entropy accumulator 230, as illustrated in FIG. 7, to help entropy accumulator 230 accumulate more entropy. Any suitable number of RBSs 210 may be used to inject random bits into entropy accumulator 230 in any suitable manner. Each RBS 210 may comprise any suitable circuitry such as that illustrated in FIG. 4. RBSs 210 for one embodiment may share the same resistors 211 and 212, differential amplifier 214, and VCO 216 yet use separate high frequency oscillators 218 and D-type latches 220 to generate and output random bits. Where entropy accumulator 230 comprises an LFSR as illustrated in FIG. 5, each RBS 210 may inject random bits at any suitable latch 232 in the LFSR. Each new random bit may be exclusive-ORed, for example, with any suitable bit stored in the LFSR, with the exclusive-OR result being input to the latch 232.

Software Emulation

RNG 174 may also be emulated in whole or in part in software executed by processor 102, for example. Processor 102 for one embodiment may implement the functioning of entropy accumulator 230, spigot 250, and RNG control circuitry 270 in software using RBS 210 as a source of random bits. Processor 102 for another embodiment may also emulate RBS 210 in software using as a source of randomness bits of data collected from computer system 100, such as the clock, running processes, status registers, keystrokes, key press timing, and mouse movements, for example. Software to emulate RNG 174 may be stored as any suitable computer executable instructions on any suitable computer readable medium, such as main memory 132, a hard disk or CD ROM driven by IDE drive(s) 142, or a floppy disk driven by floppy disk drive 155 for example.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A method comprising:
generating random bits;
processing the generated random bits to accumulate entropy in the generated random bits; and
selectively outputting the processed random bits such that at least one processed random bit is not output.

2. The method of claim 1, wherein the processing comprises propagating the random bits through a linear feedback shift register.

3. The method of claim 2, wherein the processing comprises injecting new random bits at one or more latches in the linear feedback shift register.

4. The method of claim 1, wherein the selectively outputting comprises outputting only a first predetermined number of processed random bits of one or more sets of a second predetermined number of processed random bits, wherein the first predetermined number of bits is less than the second predetermined number of bits.

5. The method of claim 4, comprising adjusting the first predetermined number of bits and/or the second predetermined number of bits.

6. The method of claim 1, wherein the generating comprises generating random bits based on integrated circuit or thermal noise.

7. An apparatus comprising:
a random bit source to generate random bits;
circuitry to process the generated random bits to accumulate entropy in the generated random bits; and
circuitry to output the processed random bits selectively such that at least one processed random bit is not output.

8. The apparatus of claim 7, wherein the random bit source generates random bits based on integrated circuit or thermal noise.

9. The apparatus of claim 7, wherein the circuitry to process the generated random bits comprises a linear feedback shift register.

10. The apparatus of claim 9, wherein the circuitry to process the generated random bits comprises one or more other random bit sources to inject random bits into the linear feedback shift register.

11. The apparatus of claim 7, wherein the circuitry to output the processed random bits selectively outputs only a first predetermined number of processed random bits of one or more sets of a second predetermined number of processed random bits, wherein the first predetermined number of bits is less than the second predetermined number of bits.

12. The apparatus of claim 11, wherein the circuitry to output the processed random bits adjusts the first predetermined number of bits and/or the second predetermined number of bits.

13. A firmware hub comprising:
   (a) a memory to store basic input/output system software; and
   (b) a random number generator comprising:
      (i) a random bit source to generate random bits,
      (ii) circuitry to process the generated random bits to accumulate entropy in the generated random bits, and
      (iii) circuitry to output the processed random bits selectively such that at least one processed random bit is not output.

14. The firmware hub of claim 13, wherein the circuitry to process the generated random bits comprises a linear feedback shift register.

15. The firmware hub of claim 14, wherein the circuitry to process the generated random bits comprises one or more other random bit sources to inject random bits into the linear feedback shift register.

16. The firmware hub of claim 13, wherein the circuitry to output the processed random bits selectively outputs only a first predetermined number of processed random bits of one or more sets of a second predetermined number of processed random bits, wherein the first predetermined number of bits is less than the second predetermined number of bits.

17. The firmware hub of claim 16, wherein the circuitry to output the processed random bits adjusts the first predetermined number of bits and/or the second predetermined number of bits.

18. The firmware hub of claim 13, wherein the random bit source generates random bits based on integrated circuit or thermal noise.

19. The firmware hub of claim 13, wherein the memory comprises flash memory.

20. A chipset comprising:
   (a) a memory controller hub;
   (b) an input/output controller hub; and
   (c) a firmware hub comprising:
      (i) a memory to store basic input/output system software, and
      (ii) a random number generator comprising:
         (A) a random bit source to generate random bits,
         (B) circuitry to process the generated random bits to accumulate entropy in the generated random bits, and
         (C) circuitry to output the processed random bits selectively such that at least one processed random bit is not output.

21. The chipset of claim 20, wherein the circuitry to output the processed random bits selectively outputs only a first predetermined number of processed random bits of one or more sets of a second predetermined number of processed random bits, wherein the first predetermined number of bits is less than the second predetermined number of bits.

22. The chipset of claim 21, wherein the circuitry to output the processed random bits adjusts the first predetermined number of bits and/or the second predetermined number of bits.

23. The chipset of claim 20, wherein the random bit source generates random bits based on semiconductor or thermal noise.

24. The chipset of claim 20, wherein the memory comprises flash memory.

25. The chipset of claim 20, wherein the circuitry to process the generated random bits comprises a linear feedback shift register.

26. The chipset of claim 25, wherein the circuitry to process the generated random bits comprises one or more other random bit sources to inject random bits into the linear feedback shift register.

27. A processor comprising:
   a random number generator comprising:
      (i) a random bit source to generate random bits,
      (ii) circuitry to process the generated random bits to accumulate entropy in the generated random bits, and
      (iii) circuitry to output the processed random bits selectively such that at least one processed random bit is not output.

28. The processor of claim 27, wherein the circuitry to output the processed random bits selectively outputs only a first predetermined number of processed random bits of one or more sets of a second predetermined number of processed random bits, wherein the first predetermined number of bits is less than the second predetermined number of bits.

29. The processor of claim 28 wherein the circuitry to output the processed random bits adjusts the first predetermined number of bits and/or the second predetermined number of bits.

30. The processor of claim 27, wherein the circuitry to process the generated random bits comprises a linear feedback shift register.

31. The processor of claim 30, wherein the circuitry to process the generated random bits comprises one or more other random bit sources to inject random bits into the linear feedback shift register.

32. The processor of claim 27, wherein the random bit source generates random bits based on integrated circuit or thermal noise.

33. A computer system comprising:
   (a) one or more processors;
   (b) a memory controller hub;
   (c) an input/output controller hub; and
   (d) a firmware hub comprising:
      (i) a memory to store basic input/output system software, and
      (ii) a random number generator comprising:
         (A) a random bit source to generate random bits,
         (B) circuitry to process the generated random bits to accumulate entropy in the generated random bits, and
         (C) circuitry to output the processed random bits selectively such that at least one processed random bit is not output.

34. The computer system of claim 33, wherein the circuitry to output the processed random bits selectively outputs only a first predetermined number of processed random bits of one or more sets of a second predetermined number of processed random bits, wherein the first predetermined number of bits is less than the second predetermined number of bits.

35. The computer system of claim 34, wherein the circuitry to output the processed random bits adjusts the first predetermined number of bits and/or the second predetermined number of bits.

36. The computer system of claim 33, wherein the circuitry to process the generated random bits comprises a linear feedback shift register.

37. The computer system of claim 36, wherein the circuitry to process the generated random bits comprises one or more other random bit sources to inject random bits into the linear feedback shift register.

38. The computer system of claim 33, wherein the random bit source generates random bits based on integrated circuit or thermal noise.

39. The computer system of claim 33, wherein the memory comprises flash memory.

40. A computer readable medium having computer executable instructions for:

processing generated random bits to accumulate entropy in the generated random bits; and selectively outputting the processed random bits such that at least one processed random bit is not output.

41. The computer readable medium of claim 40, wherein the selectively outputting comprises outputting only a first predetermined number of processed random bits of one or more sets of a second predetermined number of processed random bits, wherein the first predetermined number of bits is less than the second predetermined number of bits.

42. The computer readable medium of claim 41, having computer executable instructions for adjusting the first predetermined number of bits and/or the second predetermined number of bits.

43. The computer readable medium of claim 40, wherein the processing comprises emulating propagating the random bits through a linear feedback shift register.

44. The computer readable medium of claim 43, wherein the processing comprises emulating injecting new random bits at one or more latches in the linear feedback shift register.

45. The computer readable medium of claim 40, having computer executable instructions for generating random bits.

* * * * *

UNITED STATES PATENT AND TRADEMARK OFFICE
CERTIFICATE OF CORRECTION

PATENT NO.    : 6,687,721 B1
DATED         : February 3, 2004
INVENTOR(S)   : Wells et al.

It is certified that error appears in the above-identified patent and that said Letters Patent is hereby corrected as shown below:

<u>Column 3,</u>
Line 61, delete "1/0", insert -- I/O --.

Signed and Sealed this

Thirtieth Day of March, 2004

JON W. DUDAS
*Acting Director of the United States Patent and Trademark Office*